(12) United States Patent
Troska et al.

(10) Patent No.: US 12,716,719 B2
(45) Date of Patent: Aug. 25, 2026

(54) TILT SENSOR WITH ZERO POSITION INDICATION

(71) Applicant: TURCK Holding GmbH, Halver (DE)

(72) Inventors: Michael Troska, Gladbeck (DE); Daniel Kirchhoff, Dortmund (DE); Christian Hellmuth, Halver (DE)

(73) Assignee: TURCK HOLDING GMBH, Halver (DE)

( * ) Notice: Subject to any disclaimer, the term of this patent is extended or adjusted under 35 U.S.C. 154(b) by 275 days.

(21) Appl. No.: 17/695,862

(22) Filed: Mar. 16, 2022

(65) Prior Publication Data

US 2022/0307829 A1 Sep. 29, 2022

(30) Foreign Application Priority Data

Mar. 25, 2021 (DE) ......................... 102021107502.5

(51) Int. Cl.
*G01C 9/06* (2006.01)
*G08B 5/38* (2006.01)

(52) U.S. Cl.
CPC ................ *G01C 9/06* (2013.01); *G08B 5/38* (2013.01); *G01C 2009/066* (2013.01)

(58) Field of Classification Search
CPC ....... G01C 9/06; G01C 2009/066; G08B 5/38
See application file for complete search history.

(56) References Cited

U.S. PATENT DOCUMENTS 3,233,235 A * 2/1966 Wright ..................... G01C 9/06 33/398
3,569,716 A * 3/1971 Lewis ...................... G05D 9/12 33/366.23
3,848,750 A * 11/1974 Hoge ...................... B66C 23/78 212/277
3,861,052 A * 1/1975 Siegfried ................. G01C 9/06 33/366.26
3,953,905 A * 5/1976 Paitson ................... B63B 22/18 441/17

(Continued)

FOREIGN PATENT DOCUMENTS

DE 2510670 A1 9/1976
DE 2741411 A1 4/1978

(Continued)

OTHER PUBLICATIONS

EP-4063785-A1; Troska et al., "Inclination Sensor With Zero Position Indication", 2022. (Year: 2022).*

*Primary Examiner* — Kristina M Deherrera
*Assistant Examiner* — Tania Courson
(74) *Attorney, Agent, or Firm* — LEYDIG, VOIT & MAYER, LTD.

(57) ABSTRACT

A tilt sensor with zero position indication for indicating a predetermined zero position, including an indication device with an optical indication means and a control unit for actuating the indication device, wherein the indication device is configured to transmit a set first signal from an optical indication means in the zero position and to transmit a set second signal from the optical indication means in a position deviating from the zero position, wherein the second signal comprises an item of information about an extent of the deviation of the position deviating from the zero position, and wherein the optical indication means consists of only one light source.

14 Claims, 5 Drawing Sheets

(56) References Cited

U.S. PATENT DOCUMENTS 4,110,609 A 8/1978 Beer
4,467,527 A * 8/1984 North ..................... G01C 9/06 33/391
4,484,393 A * 11/1984 LaFreniere .............. G01C 9/32 33/366.16
4,565,010 A * 1/1986 Herman ................... G01C 9/06 33/366.23
4,625,423 A * 12/1986 Sackett .................... G01C 9/06 D10/69
4,654,977 A * 4/1987 Pakus ...................... G01C 9/06 33/379
4,707,696 A * 11/1987 Task .......................... B64F 1/20 340/955
4,766,525 A * 8/1988 Loughlin ................ E06C 7/003 362/802
4,942,668 A * 7/1990 Franklin ................ G01B 11/26 33/366.23
4,978,948 A * 12/1990 Samen .................... F21S 8/035 362/253
5,079,845 A * 1/1992 Childers ................ G01C 17/26 33/355 R
5,097,250 A * 3/1992 Hernandez ............. B62D 15/02 340/440
5,136,784 A * 8/1992 Marantz ................... G01C 9/16 33/366.27
5,864,956 A * 2/1999 Dong .................. G01C 15/105 33/286
5,953,116 A * 9/1999 Ohtomo ................... G01C 9/06 33/366.23
5,956,260 A 9/1999 Heger et al.
6,243,660 B1 * 6/2001 Hsu ........................ G01C 21/20 33/319
6,248,989 B1 * 6/2001 Ohishi ...................... G01J 1/32 33/366.23
6,343,422 B1 * 2/2002 Takahashi ................ G01C 9/06 33/366.23
6,397,133 B1 * 5/2002 van der Pol ........ B60R 21/0132 340/440
6,873,931 B1 * 3/2005 Nower ..................... G01C 9/08 702/151
6,928,366 B2 * 8/2005 Ockerse ................. G01C 17/30 701/530
7,562,458 B1 * 7/2009 Clark, Jr. ............... A61G 7/018 33/366.11
7,786,883 B1 * 8/2010 Davison, III ............. B60P 3/36 33/366.11
7,841,094 B2 * 11/2010 Schumacher .......... G01B 21/22 33/290
8,158,925 B2 * 4/2012 Sun .......................... G01C 9/12 250/239
8,263,884 B1 * 9/2012 Salmon ................ H01H 35/022 335/206
8,857,069 B2 * 10/2014 Adegawa ................ G01C 9/00 33/291
9,008,987 B2 * 4/2015 Tanabe ................. G01C 25/005 702/92
9,303,987 B2 * 4/2016 Takahashi ................ G01C 9/06
9,910,815 B2 * 3/2018 Kammerer ............ G06F 1/3287
10,495,447 B2 * 12/2019 Olexa .................. G01C 15/004
10,918,185 B2 * 2/2021 Rita ........................ A45D 24/16
11,125,557 B1 * 9/2021 Riley ................... G01C 15/008
11,175,133 B2 * 11/2021 Hwang .................... G01C 9/34
11,400,963 B2 * 8/2022 Bartek .................... B61L 5/189
11,644,295 B2 * 5/2023 Wilkinson ............... G01C 9/06 33/303
11,668,563 B2 * 6/2023 Sakakibara .............. G01C 9/04 33/366.27
11,692,820 B2 * 7/2023 Leidel ...................... G01C 9/00 33/301
11,703,409 B2 * 7/2023 Schweiger .......... G01L 19/0092 73/708
2002/0189116 A1 * 12/2002 Yang ........................ G01C 9/32 33/366.23
2004/0194329 A1 * 10/2004 Drahos .................... G01C 9/12 33/366.11
2006/0162178 A1 * 7/2006 Freidin .................... G01B 3/18 33/784
2007/0180719 A1 * 8/2007 Donnelly .................. B60S 9/02 33/366.11
2008/0172894 A1 * 7/2008 Chang ...................... G01C 9/06 33/366.16
2009/0119938 A1 * 5/2009 Song ........................ G01C 9/06 33/366.14
2009/0293297 A1 * 12/2009 Roemhild ................ G01C 9/06 33/366.16
2011/0272562 A1 * 11/2011 Chen ........................ G01C 9/12 250/216
2013/0154624 A1 * 6/2013 Taylor ...................... G01C 9/06 324/207.25
2014/0041241 A1 * 2/2014 Jaze ......................... G01C 9/12 33/301
2014/0101950 A1 4/2014 Zhuang
2016/0035199 A1 * 2/2016 Savage, Jr. ............ H04R 1/028 362/555
2017/0082400 A1 3/2017 York et al.
2017/0292237 A1 10/2017 Guggino et al.

FOREIGN PATENT DOCUMENTS

DE 3707345 A1 9/1988
DE 102013108928 A1 4/2014
EP 3517252 A1 7/2019
GB 2250600 A 6/1992
KR 20090008023 U 8/2009

* cited by examiner

TILT SENSOR WITH ZERO POSITION INDICATION

CROSS REFERENCE TO RELATED APPLICATIONS

This application claims benefit to German Patent Application No. DE 10 2021 107 502.5, filed on Mar. 25, 2021, which is hereby incorporated by reference herein.

FIELD

The present invention relates to a tilt sensor with zero position indication. The invention also relates to a method for indicating a predetermined zero position.

BACKGROUND

In many technical fields, for instance in the automation of processes, a precise knowledge of the position of an element or component in space is of crucial importance. In this context, tilt sensors are known which can output [a] the value of the tilt relative to a reference position, for example via a serial interface.

The problem arises time and again that such tilt sensors, as well as any elements or components that may be connected thereto, have to be aligned in a very laborious manner when they are commissioned. In particular, a serial communication to a device for reading out the value has to be established first of all, which means a considerable expense and requires corresponding hardware.

Furthermore, when tilt sensors which output their zero position via electronic analogue signals are commissioned, special measuring equipment is necessary in order to bring the sensor into the zero position. This complicates the use of such sensors, especially as several measuring devices are necessary in the case of tilt sensors which detect the tilt in several axes.

Tests are known for achieving the output of tilt values by means of numerical displays or through a bar chart or bar graph display with a series of light sources. This also means a considerable additional expense.

SUMMARY

In an embodiment, the present disclosure provides a tilt sensor with zero position indication for indicating a predetermined zero position, comprising an indication device with an optical indication means and a control unit for actuating the indication device, wherein the indication device is configured to transmit a set first signal from an optical indication means in the zero position and to transmit a set second signal from the optical indication means in a position deviating from the zero position, wherein the second signal comprises an item of information about an extent of the deviation of the position deviating from the zero position, and wherein the optical indication means consists of only one light source.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
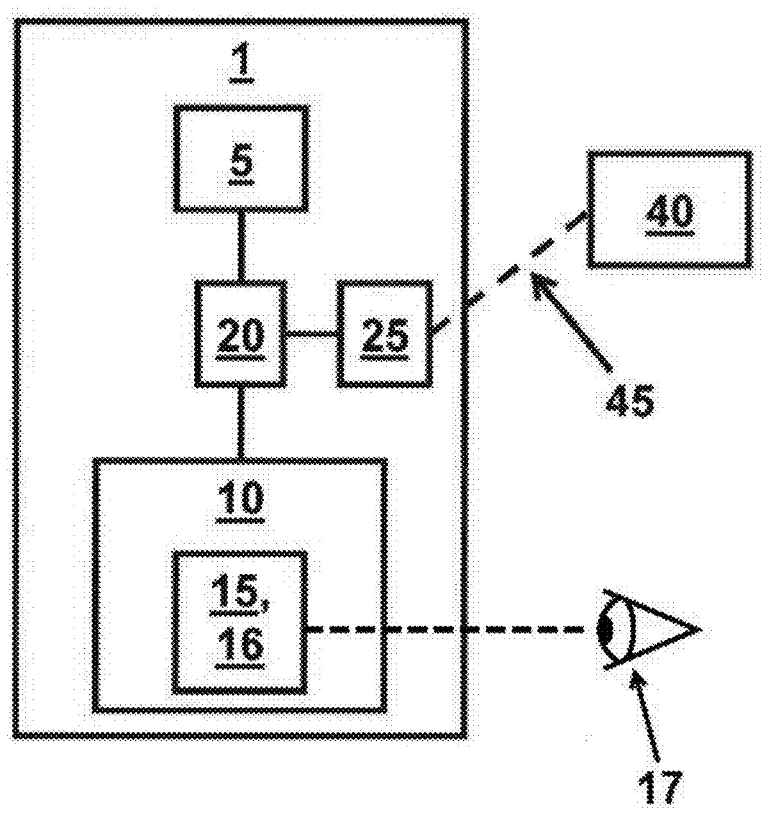
FIG. 1 illustrates a schematic representation of the tilt sensor.

Embodiments of the present invention improve tilt sensors and methods for indicating a predetermined zero position such that, among other things, a set zero position can be verified particularly easily, in particular during the commissioning of a tilt sensor.

Thus, in some embodiments, advantages of the present invention are achieved by a tilt sensor with zero position indication for indicating a predetermined zero position, wherein the tilt sensor comprises an indication device with an optical indication means and a control unit for actuating the indication device. The indication device is set up to transmit a set first signal by means of an optical indication means in the zero position and to transmit a set second signal by means of the optical indication means in a position deviating from the zero position. The second signal comprises an item of information about the extent of the deviation of the position deviating from the zero position. Furthermore, the optical indication means consists of only one light source.

The basic concept of the invention thus lies in the fact that a single light source is used to output the information. The user can therefore detect particularly easily whether a current position corresponds to the predetermined zero position or whether it deviates therefrom. The deviation is also specified quantitatively as the second signal comprises an item of information about the extent of the deviation. In particular, the first signal is therefore formed optically distinguishable from the second signal.

In some embodiments, a tilt sensor with an optical indication means consisting of only one light source is used to indicate the zero position or a deviation therefrom for a particular tilt axis. Such a tilt axis can correspond to a device axis, for instance a longitudinal or transverse axis of a component or element, to which the tilt sensor is attached, in order to monitor its tilt. In a further example, several tilt sensors each with one light source for indicating the zero position in each case for one tilt axis can be provided and integrated in a common unit.

Unlike a known tilt sensor, which only indicates qualitatively whether the current position corresponds to the zero position or deviates from it (binary display), in the case of the tilt sensor of the invention it is easy to detect quantitatively how far away from the defined zero position the current tilt is.

The invention makes it possible to easily recognize an approach towards the zero position, in particular during the commissioning, with the result that installation and alignment are simplified.

Compared with usual water spirit levels, risks to the environment and the health of a user, if for instance the liquid in a spirit level leaks out or freezes or the glass breaks, are furthermore avoided.

Unlike with other methods of measuring the tilt, in addition no parallax error occurs when reading the tilt sensor. Otherwise, such errors are to be taken into consideration in particular in the case of non-electronic methods.

Furthermore, no additional equipment is required and there are no additional manufacturing costs.

The tilt sensor uses only a single light source for the output and can therefore be used in darkness without external illumination. Furthermore, it can also be used at low temperatures, which make the use of particular displays, LCDs or liquid spirit levels difficult, for instance. In addition, the signals transmitted by means of the light source can also be visually detected and quantitatively evaluated from a greater distance, whereas, for example, a display can only be read with difficulty under such conditions, in particular in darkness.

In some embodiments, the information about the extent of the deviation from the zero position is provided in the form of a flashing frequency and/or of a colour and/or of a variable duty cycle and/or of a brightness impression of the optical indication means. The signal can thereby advantageously be detected and interpreted simply and intuitively by a user.

In some embodiments, the optical or optoelectronic parameter of the optical indication means in the case of the second signal is chosen such that a quantitative change of the parameter can be perceived by a user's eye. For example, the parameter can be incrementally or continuously changeable depending on the extent of the deviation to be indicated.

For example, the first signal can comprise a continuous illumination of the optical indication means, in particular with a particular brightness. The first signal can furthermore be output through an absence of illumination, in particular a dark state of the light source.

The second signal can, for example, comprise a flashing of the optical indication means, in particular a periodic switching between different brightnesses or between on and off states of the optical indication means. The flashing frequency can then be changeable with the extent of the deviation, for instance the higher the frequency the more the current position deviates from the zero position.

In some embodiments of the invention, the second signal can be formed as a function of the amount of the deviation. That is to say, the second signal differs depending on how much the current position deviates from the predetermined zero position. For example, the second signal can be formed differently depending on whether the current position is tilted more or less sharply relative to the predetermined zero position. The second signal can be formed independently of the direction of the deviation from the zero position, with the result that only the amount of the deviation is output here.

In an example, the light source is permanently illuminated when the current position corresponds to the predetermined zero position and flashes with an ever-lower frequency the further the current position deviates from the predetermined zero position. In further examples there can be provided a different relationship between the flashing of the light source and the quantitative deviation from the predetermined zero position, for instance an increasing flashing frequency with growing deviation, or a different modulation of the flashing signal.

Furthermore, the first and/or second signal can be output acoustically, wherein here too the extent of the deviation—in particular direction and/or amount—can be output by means of an acoustic parameter, for instance by a volume, a frequency of the acoustic vibration and/or of an acoustic signal.

In some embodiments it can be provided that the second signal is formed as a function of the direction of the deviation from the predetermined zero position. In some embodiments, the information about the extent of the deviation comprised by the second signal can relate to both the direction and the amount of the deviation. For example, the optical indication means can have different colours depending on the direction of the deviation, wherein a flashing frequency additionally depends on the amount of the deviation.

In some embodiments, it is provided that the current position is detected by means of a sensor element. The sensor element can be comprised by the tilt sensor or be in data connection with it. In some embodiments, the sensor element is set up to detect a current position, for instance relative to the predetermined zero position.

For example, the tilt can be detected as an extent of a rotation or of a tilting about a particular tilt axis in space. This extent of the rotation can comprise an amount which can be specified in degrees, for instance. It can further comprise a direction, wherein in particular two opposite directions of the rotation about the axis are possible.

The zero position can be defined relative to exactly one axis of rotation; the tilt sensor can then indicate deviations from the zero position in two opposite directions. In further examples it can also be provided that the zero position is defined as alignment in a particular plane, which is spanned by two axes of rotation running perpendicular to each other; the tilt sensor can then indicate deviations from the zero position by tilting about these two axes.

The tilt sensor comprises in particular exactly one light source for indicating the zero position or the deviation from the predetermined zero position. In some embodiments, the display by means of the light source relates to the tilt about a particular tilt axis, in particular a tilt axis set relative to the tilt sensor.

In some embodiments, the light source is a light emitting diode (LED). Alternatively or in addition, a different self-luminous display element can also be used instead of an LED.

By a single light source can also be meant several elements which are actuated to achieve a common illumination impression. Such elements can, for example, be integrated in a common assembly or on a single circuit board and be actuated together in the same way.

The predetermined zero position can, for example, be defined relative to the gravitational field of the Earth such that it corresponds to a horizontal or vertical position. In this case, the predetermined zero position is parallel or perpendicular to the course of the gravitational field of the Earth.

In some embodiments, any desired position can be defined freely as predetermined zero position, in particular a position deviating from the horizontal or vertical direction. The tilt sensor of the invention can thus be used independently of the direction of the acceleration due to gravity; this means that it is not bound to a horizontal "horizon" or a vertical direction in the gravitational field. Rather, the zero position can be defined practically as desired.

For this, an interface can, for example, be provided, via which an input of a desired value for defining the predetermined zero position can be detected.

In a further example, the predetermined zero position can be predefined by bringing the tilt sensor or its sensor element into the desired zero position and confirming that this is the predetermined zero position. This is then stored and, in the case of future measurements, a deviation from this predetermined zero position is detected and optionally the extent of the deviation is output.

In some embodiments, a predetermined zero position can be selected by selecting from a plurality of predetermined positions. For example, different predefined positions can be offered in a menu or a table, for instance via an interface or a display or output unit coupled to the tilt sensor. The selection is effected, for example, by a user input.

For example, a switch can be provided, the actuation of which results in the predefined values of a list being defined in each case as zero position in a predefined order; an output of the currently defined zero position can also be provided.

In an example with two predefined and selectable zero positions, by actuating a switch, for example, it is possible to switch between a horizontal and a vertical zero position.

In some embodiments, the tilt sensor further comprises a display element for outputting the extent of the deviation from the zero position by means of alphanumeric characters. The user can advantageously recognize with particular accuracy to what extent the current position deviates from the zero position. In some embodiments, exactly one optical indication means with exactly one light source is provided in combination with the alphanumeric display element.

In some embodiments, the tilt sensor further comprises an interface for data connection to an external device, in particular by means of a standardized communication protocol such as an IO-Link™ connection or another method. Data detected by the tilt sensor can thereby advantageously be transferred to the external device and/or the tilt sensor can be configured by means of the external device. For example, the external device can be used to define the zero position, in particular via a user interface provided by the external device and/or by means of input data detected by the external device.

Provided that the tilt sensor has a digital communication interface, for instance by means of IO-Link™ or via a comparable protocol, then any desired position can be defined as "zero position" of the tilt sensor.

For example, the predetermined zero position can be defined as inclined with respect to the horizontal or vertical, with the result that the user cannot easily estimate whether a tilt corresponds to the zero position or how far it deviates therefrom without the zero position indication. In such cases, the tilt sensor of the invention has the particular advantage that the current difference from the zero position can be easily detected by the user, even if they do not know the zero position to begin with.

For the supply of electricity, the tilt sensor can comprise an energy store, for instance a battery, or a connection to an external electrical power supply can be provided.

The invention further relates to a sensor device with at least two tilt sensors according to the present description. The tilt sensors are designed for indicating a predetermined zero position in each case along one degree of freedom.

This means, for example, that the sensor device indicates, by means of a first light source, a predetermined zero position or a deviation therefrom relative to a first tilt axis. It further indicates, by means of a second light source, a predetermined zero position or a deviation therefrom relative to a second tilt axis. The first and the second tilt axes can be perpendicular to each other. In a further example, the sensor device can comprise a third light source, by means of which a predetermined zero position or a deviation therefrom relative to a third tilt axis is indicated. The third tilt axis can also run perpendicular to the first and/or second tilt axis.

A common sensor element can be used to detect the tilt about one or more tilt axes. A 3-axis acceleration sensor element (MEMS) can be used for example. This comprises a vibrating mass, the vibration of which is influenced by accelerations such as the acceleration due to gravity. Various sensor components in the sensor element detect this vibration, for example relative to three axes aligned perpendicular to each other. The sensor element can then output these three components in the form of three acceleration values and from this the current position of the device can be determined. For instance, in the case of a 1-axis tilt sensor the three components are mathematically projected onto a particular tilt axis, in the case of a 2-axis tilt sensor the three components are projected onto two axes, in particular a pitch axis and a roll axis of the device. One light source per device axis used is used to indicate the tilt relative to a zero position predefined in each case.

Such a sensor device can be used to check an alignment along a plane and to display deviations therefrom quantitatively. In this case, the predetermined zero position is defined along two axes or directions, which are in particular aligned perpendicular to each other and span the plane in which the zero position is located.

The at least two tilt sensors of the sensor device have in each case exactly one light source, wherein the distinction can be made easier through different light parameters, for instance different colours for the light sources for outputting deviations in different directions.

In some embodiments, the tilt sensors are integrated in a common housing.

It can therefore be provided that a device comprises one or more tilt sensors, which are arranged in particular in a common housing. Each tilt sensor comprises a light unit, in particular for indicating the zero position or a deviation therefrom relative to a tilt axis of the device. To detect the tilt, the tilt sensors can use a common sensor element or several separate sensor elements as physical sensor.

In the method for indicating a predetermined zero position, a current position relative to the predetermined zero position is detected, for instance by means of a sensor element. A control signal is generated, for example by a control unit, and, on the basis of the control signal, an indication device with an optical indication means is actuated such that a set first signal is transmitted in the zero position and a set second signal is transmitted in a current position deviating from the zero position. The second signal comprises an item of information about the extent of the deviation of the position deviating from the zero position. The optical indication means consists of only one light source.

The method is suitable in particular for operating the above-explained tilt sensor. It therefore has the same advantages as the tilt sensor and it can be developed in an analogous manner.

Further details and advantages of the invention will now be explained in more detail with reference to an embodiment example represented in the drawings.

A schematic representation of the tilt sensor is explained with reference to FIG. 1.

The tilt sensor 1 comprises a sensor element 5.

It further comprises a control unit 20, a processor in the example.

It additionally comprises an optical indication device 10.

The indication device 10 comprises an indication means 15.

In the embodiment example, the indication means 15 consists of a light source 16, namely an LED 16. The light source 16 outputs light that can be perceived by a user's eye 17.

The tilt sensor 1 further comprises an interface 25.

The sensor element 5 and the optical indication device 10 are coupled to the control unit 20.

The control unit 20 is set up to receive sensor data detected by the sensor element 5.

The control unit 20 is further set up to actuate the indication device 10.

The actuation of the indication device 10 is effected in particular on the basis of the received sensor data. For example, the control unit 20 generates control data, which are transferred to the indication device 10 and as a function of which the light source 16 adopts a particular illumination state.

Furthermore, the interface 25 is coupled to the control unit 20.

In the embodiment example, the interface is designed such that a data connection 45 to an external device 40 can be established. Data can be exchanged via the data connection 45.

In the embodiment example, there is an IO-Link™ connection 45 between the interface 25 of the tilt sensor 1 and the external device 40, which here is designed as an IO-Link™ master 40: in this example, the tilt sensor 1 is configured as an IO-Link™ device. Other configurations, protocols and connection methods can be provided, in particular all wired or wireless data connections.

In a further example, the connection 45 between the tilt sensor 1 and the external device 40 is effected by means of a "single pair ethernet" connection (SPE).

The tilt sensor 1 can also be supplied with electricity via the connection 45.

In further examples, a further connection for an external power supply can be provided or the tilt sensor 1 can comprise a battery.

An embodiment example of the method for indicating a predetermined zero position or a deviation from the predetermined zero position is explained below with reference to FIGS. 1 and 2. The starting point is the embodiment example of the tilt sensor 1 explained above, which is described in more detail.

The sensor element 5 detects a current position, that is to say a current tilt. In the embodiment example, the detection is effected such that the tilt about a particular axis is detected. Sensor data with information about the current tilt are generated and transferred to the control unit 20.

In this example, the current position is detected as a deviation from a predetermined zero position, which serves as reference position or as reference tilt. In the embodiment example, the amount of the deviation from the predetermined zero position is detected. In further embodiment examples, the direction of the deviation is additionally detected.

A control signal is generated by means of the control unit 20 on the basis of the received sensor data and transferred to the optical indication device 10.

In further embodiment examples, information about the detected tilt is transferred by means of the interface 25 and via the data connection 45 to the external device 45, or it can be retrieved from the external device.

The optical indication device 10 receives the control signal. On the basis of the control signal, the indication device 10 is actuated such that the light source 16 adopts a particular illumination state.

The indication device 10 with the optical indication means 15 is actuated such that a set first signal 30 is transmitted by means of the light source 16 when the detected current position corresponds to the predetermined zero position. A particular tolerance is predefined, for instance between 0.1° and 2°, preferably 0.5°, within which deviations from the predetermined zero position are tolerated.

In contrast, if the detected current position deviates from the zero position, then a set second signal 35 is transmitted. The second signal 35 comprises an item of information about the extent of the deviation from the zero position.

The optical indication means 15 consists of only a single light source 16. In further embodiment examples, the light source 16 can comprise several light-emitting elements, which generate a light impression for the user which cannot be distinguished from each other, however. For example, a light source 16 can comprise layers or light-emitting elements illuminating in different colours, in order to be able to control the colour of the light emitted by the light source 16.

Figure 2:
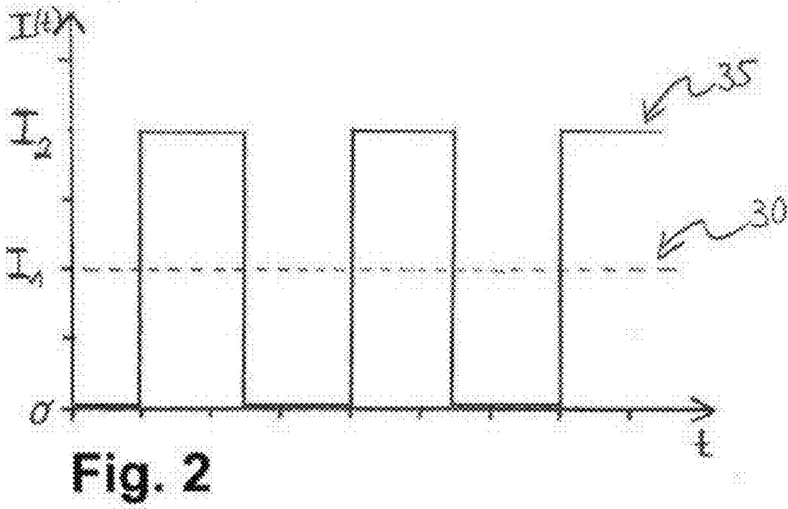
FIG. 2 illustrates an example of a first and a second Signal.

In FIG. 2, a first 30 and second 35 signal are schematically represented by way of example. The intensity I(t) of the light emitted by the light source 16 is plotted as a function of the time t in a graph. In the case of the first signal 30, the light source 16 is permanently illuminated with an intensity $I_1$. In the case of the second signal 35, the light source 16 flashes, wherein it jumps back and forth periodically between an intensity I of 0 and a further intensity $I_2$; the light source 16 is thus periodically switched on and off. In the case of a further example, the intensities $I_1$, $I_2$ for the first 30 and second 35 signals are identical.

The second signal 35 is further formed as a function of the detected deviation from the zero position. In the embodiment example, the higher the flashing frequency is, the closer the current position comes to the predetermined zero position; when the zero position is reached, the second 35 signal merges into the first 30 and the light source 16 is continuously illuminated. A particular tolerance can be provided, for example+/−0.5°, within which the zero position is assessed as having been reached. In a further embodiment example, the light source 16 flashes with a greater frequency the further away from the zero position the current position is.

In a further embodiment example, the light source 16 alternatively or additionally shines brighter the greater the deviation of the current position is from the zero position.

In some embodiments, the light source 16 is illuminated in different colours depending on the direction of the deviation from the zero position.

In a further embodiment example it can be provided that the tilt sensor 1 output using the light source 16 is activated when the current position changes or in response to an operator control action. Furthermore, a time-out can be set, for example 5 to 60 seconds, preferably 10 seconds, wherein the output by means of the light source 16 is ended when no change in the tilt is detected during this period of time.

A further embodiment example as to how the tilt sensor 1 explained above can be used is described below.

In an example, the tilt sensor 1 is commissioned, in particular together with a machine element which is connected to the tilt sensor 1, wherein the user is to locate the predefined zero position. During this commissioning, the user is assisted by the indication of the zero position or of the deviation from the zero position.

The sensor unit 5 of the tilt sensor 1 detects the tilt with respect to a defined tilt axis.

Figure 3:
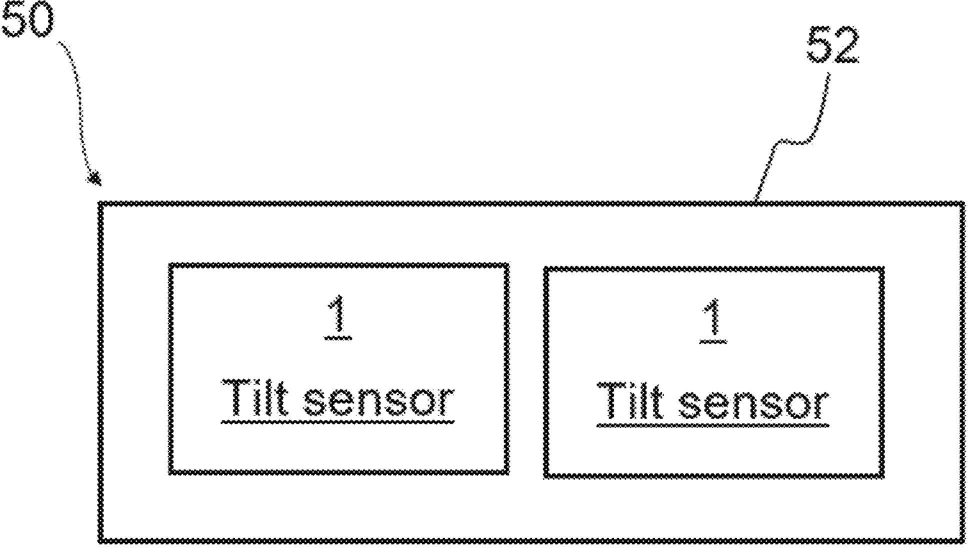
FIG. 3 illustrates a sensor device with two tilt sensors integrated in a common housing.

In further embodiment examples, several tilt sensors 1 are integrated in a sensor device, wherein the tilt sensors 1 are allocated to different tilt axes. In some embodiments, two tilt sensors 1 can be allocated to two tilt axes running perpendicular to each other. As illustrated in FIG. 3, for example, a sensor device 50 can include two tilt sensors 1 that are integrated in a common housing 52.

The several tilt sensors 1 can access the same sensor element 5 for detecting the tilt, for instance a multi-axis MEMS cell. In a further embodiment example, several sensor elements 5 can be provided.

In the embodiment example it is provided that a common control unit 20 is used to display the tilt in each case about a tilt axis of a device, for instance axis of rotation, roll axis or pitch axis, by means of several indication devices 10, in particular by means of several light sources 16. The actuation of the indication devices 10 can be effected via separate connections and/or software modules of the common control unit 20, for example.

In the embodiment example, the light source 16 is a yellow LED 16, by means of which the zero position indication is represented. The LED 16 flashes with increasing frequency the closer the detected current position comes to the zero position. It is permanently illuminated when the position of the tilt sensor 1 is located in a window of +0.5° around the predetermined zero position.

In the example, the tilt sensor 1 has a digital communication interface 25, via which the external device 40 is connected by means of an IO-Link™ connection. The external device 40 can now be used, for example within the framework of a configuration, to set a particular position as predefined zero position.

A power supply unit or a battery can be used to supply electricity to the tilt sensor 1. In further examples, the power supply can also be effected via the interface 25.

Figure 4A:
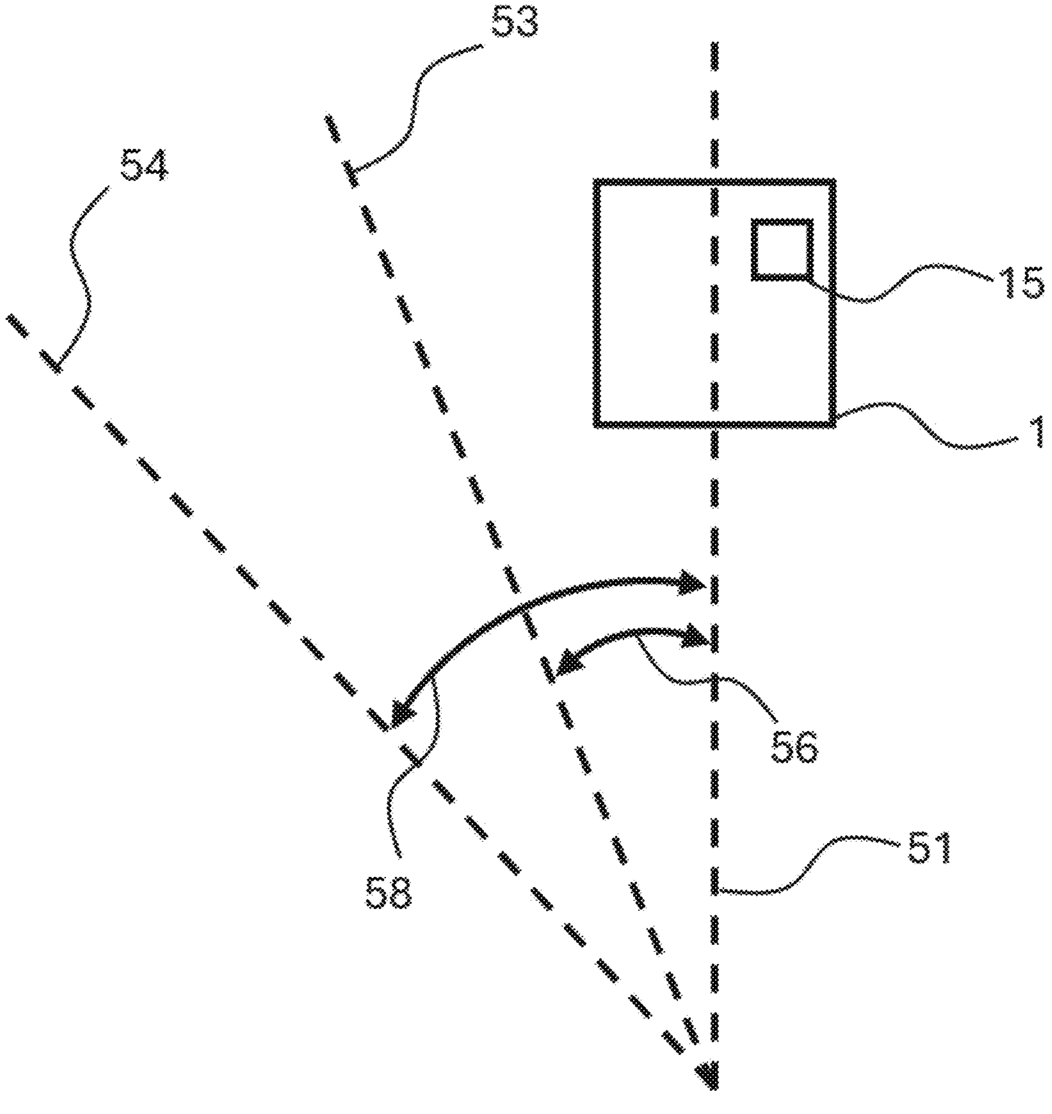
FIGS. 4A-4C illustrate schematic representations of a tilt sensor at a zero position and various current positions.
Figure 4B:
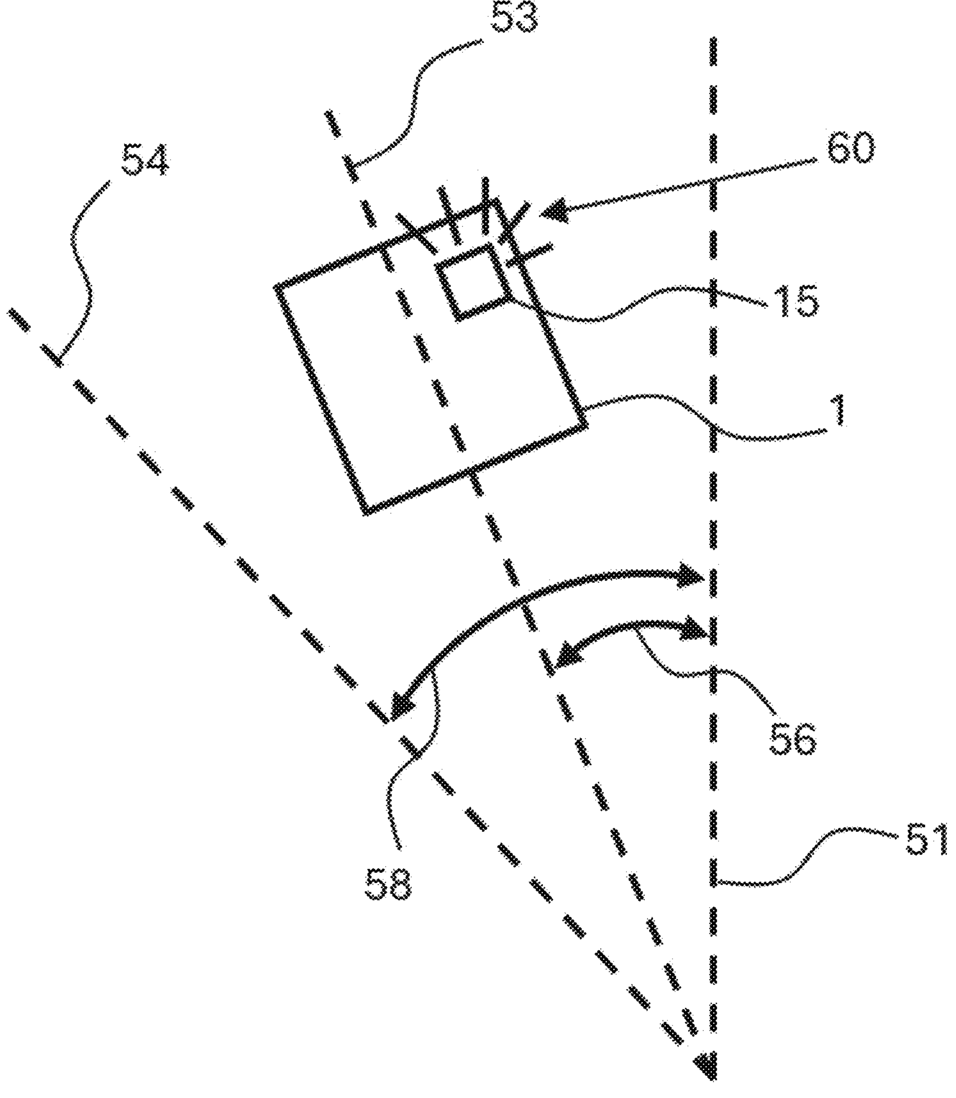
Figure 4C:
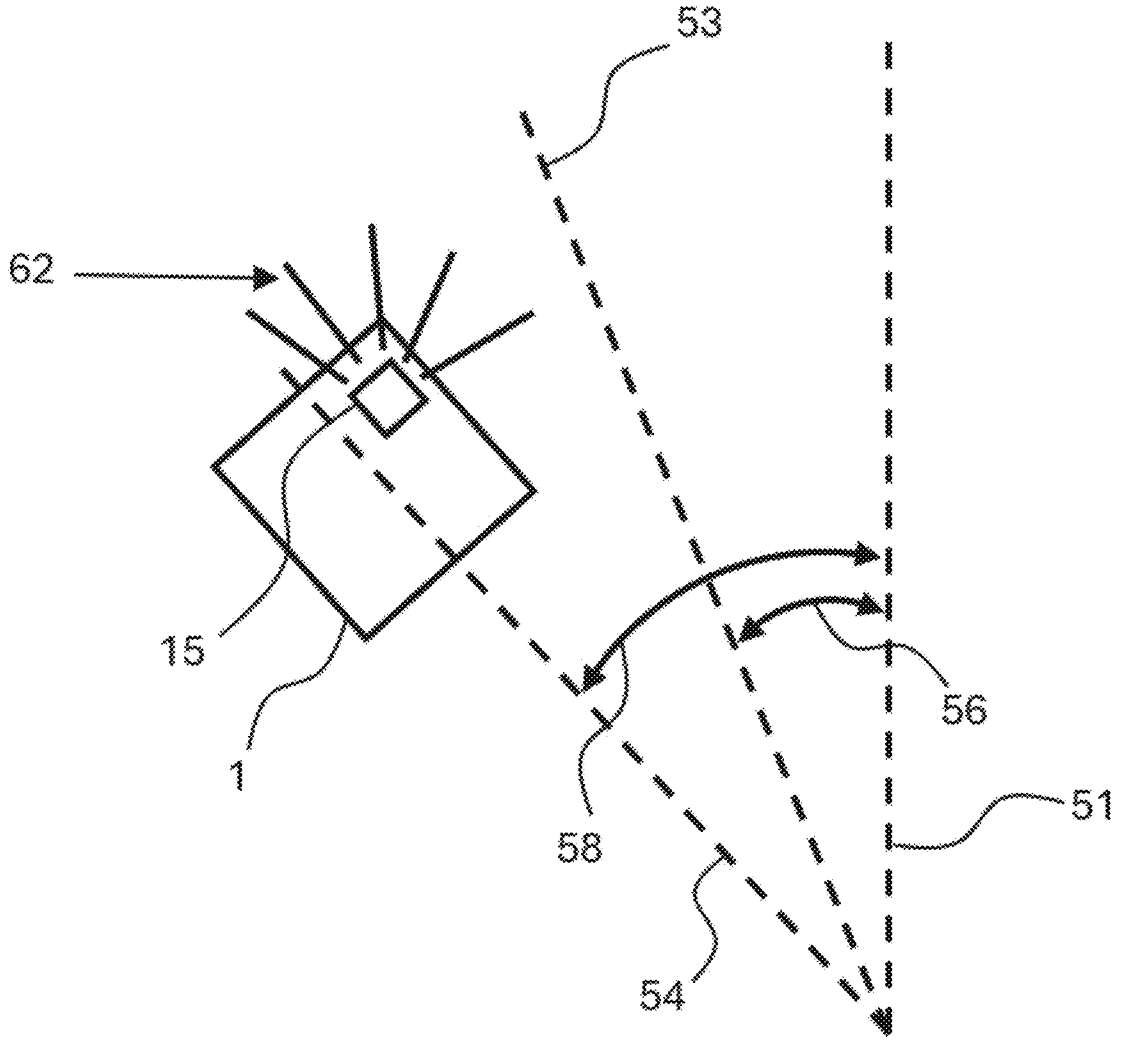

FIG. 4A illustrates the tilt sensor 1 with the indication means 15. The tilt sensor 1 is at a predetermined zero position 51. At the predetermined zero position 51, a first signal output by the indication means 15 is an absence of illumination, in particular a dark state of a light source. FIG. 4B illustrates the tilt sensor 1 at a first current position 53 that deviates from the zero position 51. At the first current position 53, a first instance of a second signal 60 is emitted by the indication means 15 as a function of the amount of the deviation 56 of the first current position 53 from the zero position 51. The first instance of the second signal 60 is emitted as a light that shines brighter than the dark state of the first signal. FIG. 4C illustrates the tilt sensor 1 at a second current position 54 that is different than the first current position 53 of FIG. 4B. At the second current position 54, a second instance of a second signal 62 is emitted by the indication means 15 as a function of the amount of the deviation 58 of the second current position 54 from the zero position 51. The second instance of the second signal 62 is emitted as a light that shines brighter than the dark state of the first signal and shines brighter than the first instance of the second signal 60 of FIG. 4B, because the deviation 58 is greater than the deviation 56.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

51 predetermined zero position
53 first current position
54 second current position
56 deviation of the first current position from the zero position
58 deviation of the second current position from the zero position
60 first instance of the second signal
62 second instance of the second signal

LIST OF REFERENCE NUMBERS

1 tilt sensor
5 sensor element
10 indication device
15 indication means
16 light source (LED)
20 control unit
25 interface
30 first signal
35 second signal
40 external device; IO-Link™ master
45 data connection; IO-Link™ connection
50 sensor device
52 common housing
I intensity
$I_1$ intensity (first signal)
$I_2$ intensity (second signal)
t time

The invention claimed is:

1. A tilt sensor with zero position indication for indicating a predetermined zero position, comprising:
- an indication device with an optical indication means configured to emit light to a user's eye; and
- a control unit for actuating the indication device, wherein:
  - the indication device is configured to transmit a set first signal from the optical indication means to the user's eye in the predetermined zero position and to transmit a set second signal from the optical indication means to the user's eye in a position deviating from the predetermined zero position,
  - the second signal comprises an item of information about an extent of a deviation of the position deviating from the predetermined zero position,
  - the second signal is formed as a continuous function of an amount of the deviation, the second signal being continuously changeable within a continuous range depending on the amount of the deviation, and the optical indication means consists of only one light source.

2. The tilt sensor according to claim 1, wherein the item of information about the extent of the deviation is provided in the form of a flashing frequency and/or of a variable duty of the optical indication means.

3. The tilt sensor according to claim 1, wherein the one light source is an LED.

4. The tilt sensor according to claim 1, wherein a position which deviates from a position perpendicular or parallel relative to the gravitational field of the Earth can be defined freely as the predetermined zero position.

5. The tilt sensor according to claim 1, wherein the predetermined zero position is selected from a plurality of predetermined positions.

6. The tilt sensor according to claim 1, further comprising a display element for outputting alphanumeric characters representing the extent of the deviation.

7. The tilt sensor according to claim 1, further comprising an interface for data connection to an external device through a data connection.

8. A sensor device with at least two tilt sensors according to claim 1, wherein the tilt sensors are each configured to indicate a predetermined zero position along one degree of freedom, and wherein the tilt sensors are integrated in a common housing.

9. The tilt sensor according to claim 1, wherein the first signal is a dark state of the one light source, wherein the second signal is an illuminated state of the one light source, and wherein the illuminated state of the one light source has a brightness based on the continuous function of the amount of the deviation such that the illuminated state is continuously brighter as the deviation increases.

10. The tilt sensor according to claim 1, wherein the first signal is a continuously illuminated state of the one light source, wherein the second signal is a flashing state of the one light source at a frequency, and wherein the frequency is based on the continuous function of the amount of the deviation such that the frequency continuously increases as the deviation decreases.

11. The tilt sensor according to claim 1, wherein the first signal is a dark state of the one light source, wherein the second signal is a flashing state of the one light source at a frequency, and wherein the frequency is based on the amount of the deviation such that the frequency continuously increases as the deviation increases.

12. The tilt sensor according to claim 1, wherein the item of information about the extent of the deviation is provided in the form of a brightness of the optical indication means.

13. A method for indicating a predetermined zero position, comprising:

detecting a current position relative to the predetermined zero position;

generating a control signal; and actuating an indication device with an optical indication means such that light is emitted to a user's eye, the indication device being actuated on the basis of the control signal such that a set first signal is transmitted to the user's eye in the predetermined zero position and a set second signal is transmitted to the user's eye in the current position deviating from the predetermined zero position, wherein the second signal comprises an item of information about an extent of a deviation of the current position, wherein the second signal is formed as a continuous function of an amount of the deviation, the second signal being configured to change within a continuous range depending on the amount of the deviation, and wherein the optical indication means consists of only one light source.

14. A tilt sensor, comprising:

an indication device consisting of one light source; and a control unit configured to actuate the indication device, wherein the indication device is configured to emit light from the one light source to a user such that the light emitted is visible to the user, wherein the indication device is configured to emit a first light signal to the user when the tilt sensor is in a zero position, wherein the indication device is configured to emit a second light signal to the user when the tilt sensor is in a current position, the current position being deviated from the zero position, wherein the first and second light signals are a flashing frequency, a colour, a variable duty cycle, and/or a brightness impression of an optical indication means, wherein the second light signal is indicative of an amount of a deviation of the second position from the first position and is formed as a continuous function of the amount of the deviation, wherein the control unit is configured to determine an amount of the deviation, and wherein the indication device is configured to emit a plurality of different light signals as the second light signal, each of the plurality of different light signals being indicative of the amount of the deviation of a given position from the zero position within a continuous range of positions.

* * * * *